United States Patent
Diner et al.

(10) Patent No.: US 12,175,404 B2
(45) Date of Patent: Dec. 24, 2024

(54) SYSTEM AND METHODS TO DERIVE KNOWLEDGE BASE ARTICLE RELEVANCY SCORE

(71) Applicant: NICE LTD, Ra'anana (IL)

(72) Inventors: Shay Diner, Holon (IL); Gennadi Lembersky, Haifa (IL); Animesh Udawat, Ajmer (IN); Sourav Rath, Pune (IN); Mahesh Bairagi, Pune (IN); Amol Anwade, Pune (IN)

(73) Assignee: NICE LTD., Ra'anana (IL)

( * ) Notice: Subject to any disclaimer, the term of this patent is extended or adjusted under 35 U.S.C. 154(b) by 251 days.

(21) Appl. No.: 17/864,003

(22) Filed: Jul. 13, 2022

(65) Prior Publication Data
US 2024/0020617 A1 Jan. 18, 2024

(51) Int. Cl.
*G06Q 10/00* (2023.01)
*G06Q 10/0639* (2023.01)
*G06Q 50/20* (2012.01)

(52) U.S. Cl.
CPC ..... *G06Q 10/06398* (2013.01); *G06Q 50/205* (2013.01)

(58) Field of Classification Search
None
See application file for complete search history.

(56) References Cited

U.S. PATENT DOCUMENTS

| | | | | |
|---|---|---|---|---|
| 8,078,486 B1* | 12/2011 | McLean | ......... | G06Q 10/063114 705/7.14 |
| 8,767,948 B1* | 7/2014 | Riahi | ................. | H04M 3/5175 379/266.01 |
| 9,313,332 B1* | 4/2016 | Kumar | .................... | G10L 17/24 |
| 10,091,357 B1* | 10/2018 | Stern | .................... | H04M 3/5175 |
| 11,263,385 B1* | 3/2022 | Luk | ..................... | G06F 16/9577 |
| 2003/0055705 A1* | 3/2003 | Kilpatrick | ........... | H04M 3/5233 379/265.12 |
| 2006/0072739 A1* | 4/2006 | Baggenstoss | ....... | H04M 3/5233 379/265.05 |
| 2008/0240404 A1* | 10/2008 | Conway | ............. | H04M 3/5175 379/212.01 |
| 2009/0046846 A1* | 2/2009 | Lew | .................... | H04M 3/5233 379/265.11 |

(Continued)

FOREIGN PATENT DOCUMENTS

WO WO-2005020546 A2 * 3/2005 .......... H04M 3/5232

OTHER PUBLICATIONS

M Rod, NJ Ashill et al. (The impact of call center stressors on inbound and outbound call-center agent burnout)—Managing Service Quality: An International Journal, 2013—emerald.com; (Year: 2013).*

(Continued)

*Primary Examiner* — Hafiz A Kassim
(74) *Attorney, Agent, or Firm* — Haynes and Boone, LLP

(57) ABSTRACT

Coaching systems and methods, and non-transitory computer readable media, include analyzing an agent's interactions to identify knowledge gaps and specific topics where an agent has difficulties. An algorithm uses bootstrap sampling to verify that an agent's scores are significantly different from other agents' scores. The algorithm further uses a mutual information score to find topics that are associated with interactions having a high knowledge gap score.

17 Claims, 7 Drawing Sheets

(56) References Cited

U.S. PATENT DOCUMENTS

| | | | |
|---|---|---|---|
| 2013/0051545 A1* | 2/2013 | Ross | H04M 3/523 379/265.02 |
| 2013/0282594 A1* | 10/2013 | Gaedcke | G06Q 30/0201 705/304 |
| 2014/0093062 A1* | 4/2014 | McCormack | H04M 3/5233 379/265.12 |
| 2015/0195406 A1* | 7/2015 | Dwyer | G10L 15/02 379/265.07 |
| 2016/0019310 A1* | 1/2016 | Liu | G06F 16/957 715/205 |
| 2016/0188672 A1* | 6/2016 | Lev | G06Q 30/0281 707/728 |
| 2016/0295019 A1* | 10/2016 | O'Connor | H04M 3/5175 |
| 2017/0064081 A1* | 3/2017 | Chishti | H04M 3/5233 |
| 2017/0300499 A1* | 10/2017 | Lev-Tov | G06F 16/3329 |
| 2018/0091654 A1* | 3/2018 | Miller | H04M 3/42221 |
| 2018/0096278 A1* | 4/2018 | Lev-Tov | G10L 15/22 |
| 2020/0126126 A1* | 4/2020 | Briancon | G06N 20/20 |
| 2021/0344800 A1* | 11/2021 | Shwartz | G06N 3/006 |
| 2022/0004715 A1* | 1/2022 | Patel | G06N 5/022 |

OTHER PUBLICATIONS

D Garg (Mining Top Issues from Contact Center Logs for Self Help) IEEE Xplore-https://ieeexplore.ieee.org, 2008). (Year: 2008).*

* cited by examiner

FIG. 4B

SYSTEM AND METHODS TO DERIVE KNOWLEDGE BASE ARTICLE RELEVANCY SCORE

TECHNICAL FIELD

The present disclosure relates generally to methods and systems for coaching agents in a contact center, and more specifically relates to methods and systems that determine and provide coaching material to an agent based on knowledge gaps and specific topics where an agent has difficulties.

BACKGROUND

Contact center coaching is a quality management activity to provide contact center agents (also referred to herein as agents) with feedback, examples, performance assessments, and best-practice activities to help improve the skillset of the agents. As such, contact center coaching is one key ingredient for improving agent performance and increasing overall customer satisfaction.

To create a coaching session for an agent, one of the main challenges that a supervisor is confronted with is how to find the most relevant content for the coaching session. Typically, to find the relevant content for a coaching session, a supervisor must manually analyze the low-scoring interactions of an agent and determine the areas where the agent needs to improve. Once the supervisor identifies the areas where the agent needs assistance, the supervisor searches for or creates coaching content that can improve the agent's ability.

To find the relevant content, the supervisor must spend a large amount of time trying to find the root cause of the agent's under performance. The supervisor's decisions may be impacted by human error and/or bias, and this can adversely impact the quality of the coaching. Moreover, when the supervisor does find the root cause, he or she struggles with finding the right content because the coaching information is typically not indexed, which makes finding the right coaching content even more complicated. In many cases, the whole process is inaccurate and damages the effectiveness of coaching, potentially including the morale of the agent.

Accordingly, a need exists for improved systems and methods for determining and providing relevant coaching content.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4B illustrates a coaching page for an agent according to embodiments of the present disclosure.

DETAILED DESCRIPTION

Figure 1:
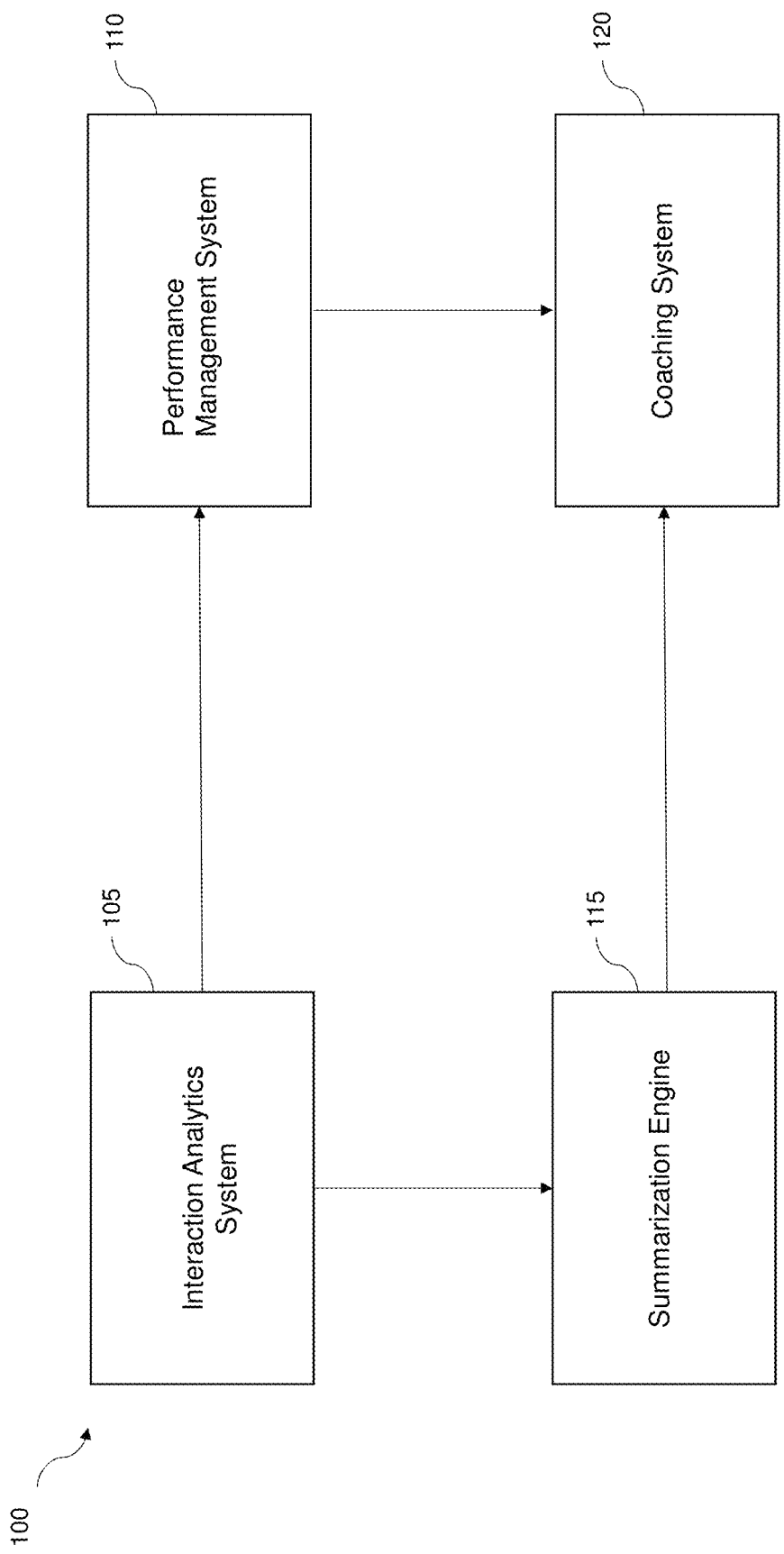
FIG. 1 is a simplified block diagram of a computing environment including a coaching system according to various aspects of the present disclosure.

This description and the accompanying drawings that illustrate aspects, embodiments, implementations, or applications should not be taken as limiting—the claims define the protected invention. Various mechanical, compositional, structural, user interface, electrical, and operational changes may be made without departing from the spirit and scope of this description and the claims. In some instances, well-known circuits, structures, on-screen arrangements, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present invention analyzes an agent's interactions to identify knowledge gaps and specific topics where an agent has difficulties. In one or more embodiments, an algorithm iterates over a list of agents and over a list of skills assigned to each agent, and performs an analysis for each agent and for each skill.

In various embodiments, the algorithm first identifies the skills where an agent has a performance gap. The performance gap can be attributed to a soft skills (behavior) gap, a knowledge gap or another gap not related to agent factors. Next, the algorithm checks that the performance gap is not related to agent behavior by comparing agent behavioral scores to those of other contact center agents. In an exemplary embodiment, the bootstrap sampling method is used to verify that the difference in behavioral scores is statistically significant. The algorithm then computes a knowledge gap score for each of the agent's interactions and checks if the agent's knowledge gap score is significantly larger than other contact center agents. In various embodiments, the bootstrap sampling method is used to verify that the difference in knowledge gaps scores is statistically significant.

In the next step, the algorithm identifies the topics where an agent has difficulties. In an exemplary embodiment, the algorithm uses a mutual information score to identify topics that occur more in interactions with a high knowledge gap score. For each identified topic, the algorithm extracts a set of terms that describe the topic. The terms are then sent to a knowledge base that returns knowledge base articles. In certain embodiments, the algorithm removes knowledge base articles with a relevancy score below a threshold, and the remaining articles (i.e., that articles that meet or are above the threshold) are presented to a supervisor or an agent. Alternatively, articles can be added to a new coaching session, which is then assigned to an agent.

Advantageously, the present invention minimizes or avoids the time a supervisor spends preparing and finding coaching materials, thereby permitting the supervisor to either manage a larger group of supervisees, focus more on quality customer service, or both. By providing automation, the present invention advantageously saves the supervisor from at least some manual work and taking the time to search for or creating the right coaching package. The present systems and methods can also advantageously improve the quality of the coaching by minimizing or avoiding biases and human error that can affect such supervisory efforts. The algorithm matching process with indexing in coaching packages minimizes or even prevents the constant struggle of the supervisor with finding the right content.

Coaching effectiveness is improved by reducing human overhead and inaccuracy. Agent and supervisor attrition is also reduced. Moreover, recommending relevant coaching content improves agent performance, particularly the operational key performance indicators (KPIs). The top three performance KPIs that are tracked and easier to coach tend to be Net Promoter Score (NPS), First Call Resolution (FCR), and schedule adherence. Other performance KPIs include customer satisfaction (CSAT), average handling time (AHT), first response time (FRT), average caller hold time, transfer time, talk time (portion of the interaction with speech), and silence time (portion of the interaction without speech). The present invention also empowers agents to request more coaching because they can trust the previous coaching materials suggested to them and see their improvements.

FIG. 1 illustrates a block diagram of an exemplary computing environment 100 according to embodiments of the present disclosure. The computing environment 100 includes interaction analytics system 105, performance management system 110, summarization engine 115, and coaching system 120. In one or more embodiments, contact center interactions between agents and customers are analyzed by interaction analytics system 105. In one embodiment, interaction analytics system 105 identifies facts and metrics in each interaction, and processes the interactions. Interaction analytics system 105 sends the facts and metrics to performance management system 110, and the processed interactions to summarization engine 115. Summarization engine 115 creates metric and behavior summaries from the processed interactions. In certain embodiments, summarization engine 115 analyzes interaction transcripts sentence by sentence, and identifies the main topics, the main categories, and other attributes (such as sentiment and scores).

In various embodiments, performance management system 110 collects facts and metrics data from interaction analytics system 105 to create agent performance KPIs. Performance KPIs are used to assess productivity and proficiency of contact center agents against set goals. Scores for KPIs such as call time, idle time, FCR, and AHT are checked against goal values, and the performance KPI score is calculated. AHT denotes call handling time by an agent or duration of an interaction. Lower values are better for this metric checked against a set goal. FCR denotes the ability of an agent to resolve queries in the first call checked against a set goal. Higher values denote better performance. In one or more embodiments, a performance KPI score for a given duration or grain of time is calculated using the formula:

$$KPI = [Metric/Goal]_t$$

where KPI denotes progress of the metric against the goal, Metric is the score of the metric achieved by the agent, Goal is the goal score of the metric set by the contact center, and t is the duration of the assessment. In one or more embodiments, a user can select specific metrics (e.g., FCR or AHT) to be included in the performance KPIs. In several embodiments, the metrics can be used to identify a knowledge gap.

In an exemplary embodiment, coaching system 120 receives from summarization engine 115 and performance management system 110 one or more of the following: performance KPI scores, AHT scores, FCR scores, sentiment scores (a score between 0 and 1 that specifies the sentiment of an interaction where 0 is negative and 1 is positive), behavioral scores (a score between 0 and 1 where 0 is negative and 1 is positive), call categories, call topics, agent IDs (unique numeric agent identifiers), agent skills (unique numeric skill identifiers), talk time, silence time, and interaction summaries. An agent skill specifies a specific capability that relates to the nature of the provided service. For example, an agent skill could be a unique combination of language, service channel, and business process. The performance KPI scores from performance management system 110 along with the summarization results from summarization engine 115 are processed by coaching system 120 to help identify relevant coaching topics for a particular agent, including an agent assigned to a particular service channel, business process, language, or combination thereof. Reports and insights can be created based on final coaching results.

In various embodiments, an algorithm runs on coaching system 120 and analyzes agent interactions to identify knowledge gaps and specific topics in which an agent has difficulties or has lower scores. In certain embodiments, on a weekly (or monthly) basis, the algorithm iterates over a list of agents and over a list of skills assigned to each agent. In certain embodiments, for each agent skill, coaching system 120 determines if an agent has knowledge gaps and determines problematic topics. For each topic, coaching system 120 expands the topic to a list of terms, uses the terms to search for knowledge base articles, and removes articles below a given relevancy threshold. Knowledge base articles are documents that answer or provide instructions for solving customer problems. Knowledge base articles typically contain frequently asked questions, how-to guides, and troubleshooting instructions. Knowledge base articles can be in the form of text, videos, images, infographics, glossaries, and/or definition lists.

Figure 2:
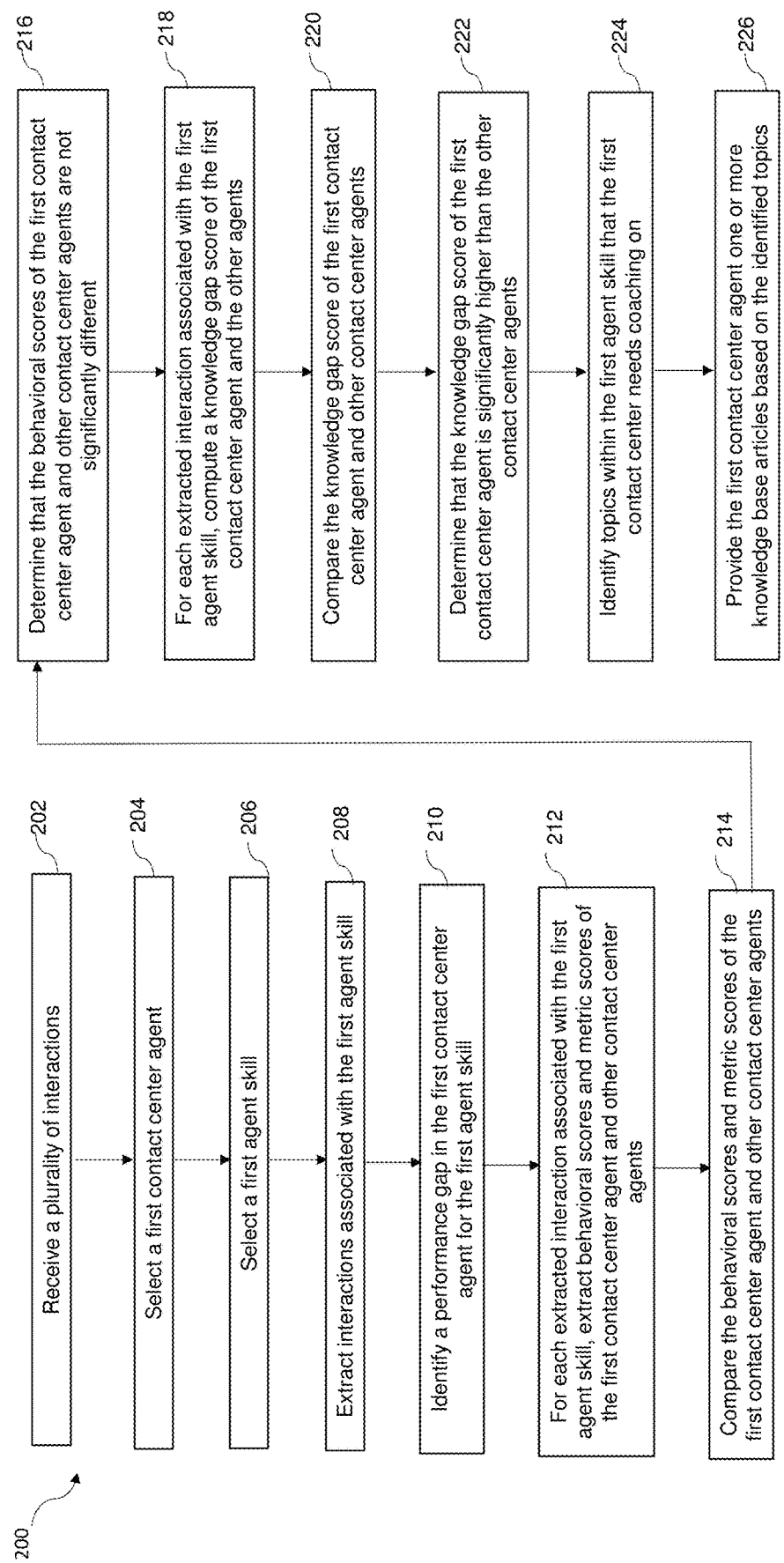
FIG. 2 is a flowchart of a method according to embodiments of the present disclosure.

Referring now to FIG. 2, a method 200 according to embodiments of the present disclosure is described. At step 202, interaction analytics system 105 receives a plurality of interactions between a plurality of customers and a plurality of contact center agents. Interaction analytics system 105 provides the processed interactions to summarization engine 115 and facts and metrics to performance management system 110. In various embodiments, agent IDs, agent skills, AHT scores, behavioral scores, FCR scores, and customer satisfaction scores are determined or computed by interaction analytics system 105, and may be provided to coaching system 120 either by performance management system 110 or by summarization engine 115. Summarization engine 115 provides subject categories and topics to coaching system 120. In certain embodiments, summarization engine 115 provides summarized information of the processed interactions to coaching system 120, such as agent IDs, agent skills, AHT scores, behavioral scores, FCR scores, customer satisfaction scores, subject categories, and subject topics. At step 204, coaching system 120 selects a first contact center agent from the plurality of contact center agents provided by performance management system 110. At step 206, coaching system 120 selects a first agent skill from the plurality of agent skills assigned to the first contact center agent provided by performance management system 110. In various embodiments, all of the interactions of the first contact center agent in a given time interval are selected, and the interactions are grouped according to agent skill (or the reason for the call). Agent skills that involve less than a certain configurable number (e.g., 20-30) of interactions are removed. At step 208, coaching system 120 extracts interactions associated with the first agent skill from the plurality of interactions.

At step 210, coaching system 120 identifies a performance gap in the first contact center agent for the first agent skill based on the extracted interactions associated with the first agent skill. In some embodiments, coaching system 120 obtains the agent ID, first agent skill, and performance threshold information from performance management system 110, and coaching system 120 outputs whether or not there is a performance gap for the first agent skill. In various embodiments, coaching system 120 receives from performance management system 110, the first contact center agent's performance score for the first agent skill and the performance scores of other contact center agents for the first agent skill. A performance score is typically a numeric value between 0 and 100, and is generally a weighted average of several metrics. The exact formula of the performance score is usually set by the organization. Other contact center agents can be other agents on the same team as the first contact center agent, other agents in the same geographical site as the first contact center agent, or other agents in the same contact center as the first contact center agent. If the difference between the performance score of the first contact center agent and the performance score of the other contact center agents is greater than the performance threshold, then method 200 moves to step 212. If the difference is not greater than the performance threshold, then the algorithm switches to the next agent skill or the next contact center agent.

At step 212, coaching system 120, for each extracted interaction associated with the first agent skill, extracts behavioral scores and metric scores of the first contact center agent and the other contact center agents. In one embodiment, a sample of interactions (e.g., 1000 interactions) associated with the other contact center agents and the first agent skill are selected. For example, coaching system 120 receives behavioral scores and metric scores from performance management system 110. Coaching system 120 selects the behavioral scores and metric scores associated with the first agent skill for the first contact center agent and the other contact center agents. In an embodiment, coaching system 120 extracts metric scores for FCR, talk time, and silence time for the first contact center agent and the other contact center agents.

At step 214, coaching system 120 compares the behavioral scores and the metric scores of the first contact center agent and the other contact center agents Behavioral scores can relate to one of more of the following: communication, listening skills, empathy, positive attitude, team player, organizational ability, knowledge retention, speed/accuracy, mentoring, negotiation, composure, and creativity.

At step 216, coaching system 120 determines that the behavioral scores of the first contact center agent and the other contact center agents are not significantly different by using a bootstrap sampling method. Step 216 is used to determine whether or not the performance gap is due to agent behaviors. The bootstrap sampling method is a statistical technique for estimating quantities about a population by averaging estimates from multiple small data samples. Samples are constructed by drawing observations from a large data sample one at a time and returning them to the data sample after they have been chosen.

For example, assume a sample of 100 interactions related to a behavior of the first contact center agent and the other contact center agents is selected. If the median behavioral score of the agent is less than the median behavioral score of the other contact center agents, then one is added to the counter and the algorithm moves on to the next interaction. This process is repeated many (e.g., 1000 times). If the counter is greater than or equal to 950 with a p-value=0.05, then the behavioral score of the first contact center agent is significantly lower than the behavioral scores of the other contact center agents. If at least one behavioral score of the first contact center agent is significantly lower than the corresponding other contact center agents' behavioral score, the first contact center agent should focus on improvement of behaviors (rather than improving knowledge). If the counter is not greater than or equal to 950, then the behavioral score of the first contact center agent is not significantly lower than the behavioral scores of the other contact center agents, and method 200 moves to step 218.

At step 218, coaching system 120, for each extracted interaction associated with the first agent skill, computes a knowledge gap score of the first contact center agent and the other contact center agents based on the respective metric scores. In various embodiments, coaching system 120 computes the knowledge gap score for each interaction by computing a weighted sum of metric scores for FCR, talk time, and silence time. In an exemplary embodiment, the knowledge gap score is computed according to the following equation:

> Knowledge gap score=$\alpha$FCR+$\beta$TalkTime/max(Talk)+ $\gamma$SilenceTime/max(Silence) where $\alpha,\beta$ and $\gamma$ are configurable(0.33 by default),maximum talk time is the longest talk time among all the interactions considered, and maximum silence time is the longest silence time among all the interactions considered.

At step 220, coaching system 120 compares the knowledge gap score of the first contact center agent and the other contact center agents. At step 222, coaching system 120 determines that the knowledge gap score of the first contact center agent is significantly higher than the knowledge gap score of the other contact center agents, or of the average of a selected/comparable group of agents. In an exemplary embodiment, this determination is made using the bootstrap sampling method.

At step 224, coaching system 120 identifies topics within the first agent skill that the first contact center agent needs coaching on by calculating a mutual information score for each topic. In various embodiments, coaching system 120 is provided with agent IDs, agent skills, interactions, knowledge gap scores, and interaction summaries, and outputs a list of topics with a high mutual information score. In certain embodiments, coaching system 120 sorts interactions from the plurality of interactions associated with the first agent skill based on the knowledge gap score of the first contact center agent and the other contact center agents, selects sorted interactions in a top quartile (e.g., highest knowledge gap score) and a bottom quartile (e.g., lowest knowledge gap score) based on the knowledge gap score, collects topics that occur in the top quartile and the bottom quartile, removes topics that occur less in the top quartile than in the bottom quartile (topics that occur in the top quartile are desired), and returns topics with the highest mutual information score. In an exemplary embodiment, the mutual information score for each returned topic is calculated according to the following equation:

$$MI(X, Y) = \sum_{x \in X} \sum_{y \in Y} p_{(X,Y)}(x, y) \log \frac{p_{(X,Y)}(x, y)}{p_X(x) p_Y(y)}$$

where $P_{(X,Y)}$ is the joint probability mass function of X and Y, $P_X$ and $P_Y$ are the marginal probability mass functions of X and Y respectively, X means the topic occurs (1) or does not occur (0) and Y means the set is TOP (1) or BOTTOM (0) quartile. The mutual information score is a measure of the strength of association between two variables.

At step 226, coaching system 120 provides to the first contact center agent one or more knowledge base articles selected based on the identified topics. In various embodiments, providing the knowledge base articles includes automatically performing an action to provide the one or more knowledge base articles to the first contact center agent. In one embodiment, the action includes automatically creating a coaching session for the first contact center agent that includes the one or more knowledge base articles, or transmitting an alert to the first contact center agent or a supervisor including a recommendation that the first contact center agent should review the one or more knowledge base articles.

In certain embodiments, coaching system 120 expands the identified topics to a list of terms. For example, for each of the identified topics, coaching system 120 extracts a list of terms from a dictionary, and combines the extracted lists. In some embodiments, coaching system 120 transmits the list of terms to a knowledge base, receives one or more knowledge base articles from the knowledge base, and automatically provides the one or more knowledge base articles to the first contact center agent.

In several embodiments, coaching system 120 forms a search query from the list of terms and transmits the query to a knowledge base, and the knowledge base retrieves a set of documents with an attached relevancy score. The relevancy score indicates how relevant the document is to the query. In some embodiments, summarization engine 115 establishes a relevancy threshold (e.g., 90%). Coaching system 120 removes any knowledge base article having a relevancy score below the relevancy threshold and returns knowledge base articles having a relevancy score above the relevancy threshold.

To validate the algorithm, about 24,000 chat conversations that were randomly distributed between twenty (20) agents were generated. For each conversation, an FCR score and one behavioral score were generated. The scores were generated according to a beta-distribution. Also, a summarization tool was run to extract the main categories and topics for each conversation.

The conversations were distributed between nine (9) agent skills: billing, Internet, TV and cable, account, retention, phone and cellular, service call, customer service, and Xfinity home.

TABLE 1

AGENT SKILLS

| Skill | No. of chats |
|---|---|
| Billing | 8470 |
| Internet | 7979 |
| Tv & Cable | 3006 |
| Account | 1259 |
| Retention | 1081 |
| Phone & Cellular | 856 |
| Service Call | 810 |
| Customer Service | 278 |
| Xfinity Home | 160 |

Table 2 below provides a few examples of the data set for one agent.

TABLE 2

DATA SET FOR ONE AGENT

| Chat ID | AgentId | Category | FCR | Behavior |
|---|---|---|---|---|
| 0 | 1 | Account | 0.269231 | 0.563604 |
| 1 | 1 | Billing | 0.294303 | 0.562944 |
| 2 | 1 | Customer Service | 0.293128 | 0.620464 |
| 3 | 1 | Internet | 0.294979 | 0.565672 |
| 4 | 1 | Phone & Cellular | 0.312941 | 0.599747 |

Next, agents with knowledge gaps in a specific skill were identified. For example, the skill "Account" was focused on, and four (4) agents were identified (AgentId 1, 6, 16, and 18) that exhibited a gap in FCR, but not in the behavior.

TABLE 3

KNOWLEDGE GAP SCORE

| AgentId | Skill | FCR | Behavior | FCR_diff | Behavior_diff |
|---|---|---|---|---|---|
| 1** | Account | 0.269231 | 0.563604 | TRUE | FALSE |
| 2 | Account | 0.300824 | 0.558366 | FALSE | FALSE |
| 3 | Account | 0.331662 | 0.555509 | FALSE | FALSE |
| 4 | Account | 0.290455 | 0.553247 | FALSE | FALSE |
| 5 | Account | 0.298632 | 0.548377 | FALSE | FALSE |
| 6** | Account | 0.250039 | 0.582134 | TRUE | FALSE |
| 7 | Account | 0.310894 | 0.537131 | FALSE | FALSE |
| 8 | Account | 0.314047 | 0.531012 | FALSE | TRUE |
| 9 | Account | 0.290535 | 0.544018 | FALSE | FALSE |
| 10 | Account | 0.311089 | 0.56404 | FALSE | FALSE |
| 11 | Account | 0.283202 | 0.558675 | FALSE | FALSE |
| 12 | Account | 0.274793 | 0.525739 | TRUE | TRUE |
| 13 | Account | 0.309153 | 0.588637 | FALSE | FALSE |
| 14 | Account | 0.287096 | 0.568929 | FALSE | FALSE |
| 15 | Account | 0.297232 | 0.580366 | FALSE | FALSE |
| 16** | Account | 0.251547 | 0.565217 | TRUE | FALSE |
| 17 | Account | 0.334944 | 0.57769 | FALSE | FALSE |
| 18** | Account | 0.273126 | 0.610299 | TRUE | FALSE |
| 19 | Account | 0.285911 | 0.583275 | FALSE | FALSE |
| 20 | Account | 0.292232 | 0.577069 | FALSE | FALSE |

Once these agents were identified, the algorithm selected one of the agents (AgentID 6) to focus on the skill of "Account." The algorithm calculated the mutual information score for the topics that frequently occur in "Account" conversations.

TABLE 4

MUTUAL INFORMATION SCORES

| Topic | Mutual Information Score |
|---|---|
| Tv & Cable Streaming | 0.14818913546276036 |

TABLE 4-continued

MUTUAL INFORMATION SCORES

| Topic | Mutual Information Score |
| --- | --- |
| Tv & Cable On Demand | 0.07010458162909708 |
| Internet Outage | 0.03416263269545201 |
| Internet Package & Sales | 0.03416263269545201 |
| Phone & Cellular Activation | 0.03416263269545201 |
| Phone & Cellular Equipment & Devices | 0.03416263269545201 |
| Phone & Cellular Porting | 0.03416263269545201 |
| Tv & Cable Display | 0.03416263269545201 |
| Tv & Cable Equipment & Devices | 0.03416263269545201 |
| Tv & Cable Guide & Settings | 0.03416263269545201 |
| Tv & Cable Troubleshooting | 0.03416263269545201 |
| Billing Payment | 0.02886579159851347 |
| Internet Usage | 0.009061172802117799 |

Based on these MI scores, the algorithm can select the topics with the highest MI score, and expand each topic with a list of terms. These terms can then be used to form a search query that retrieves a set of documents with the highest relevancy scores. Advantageously, the documents can be used to create a coaching session for the agent (AgentID 6).

Figure 3:
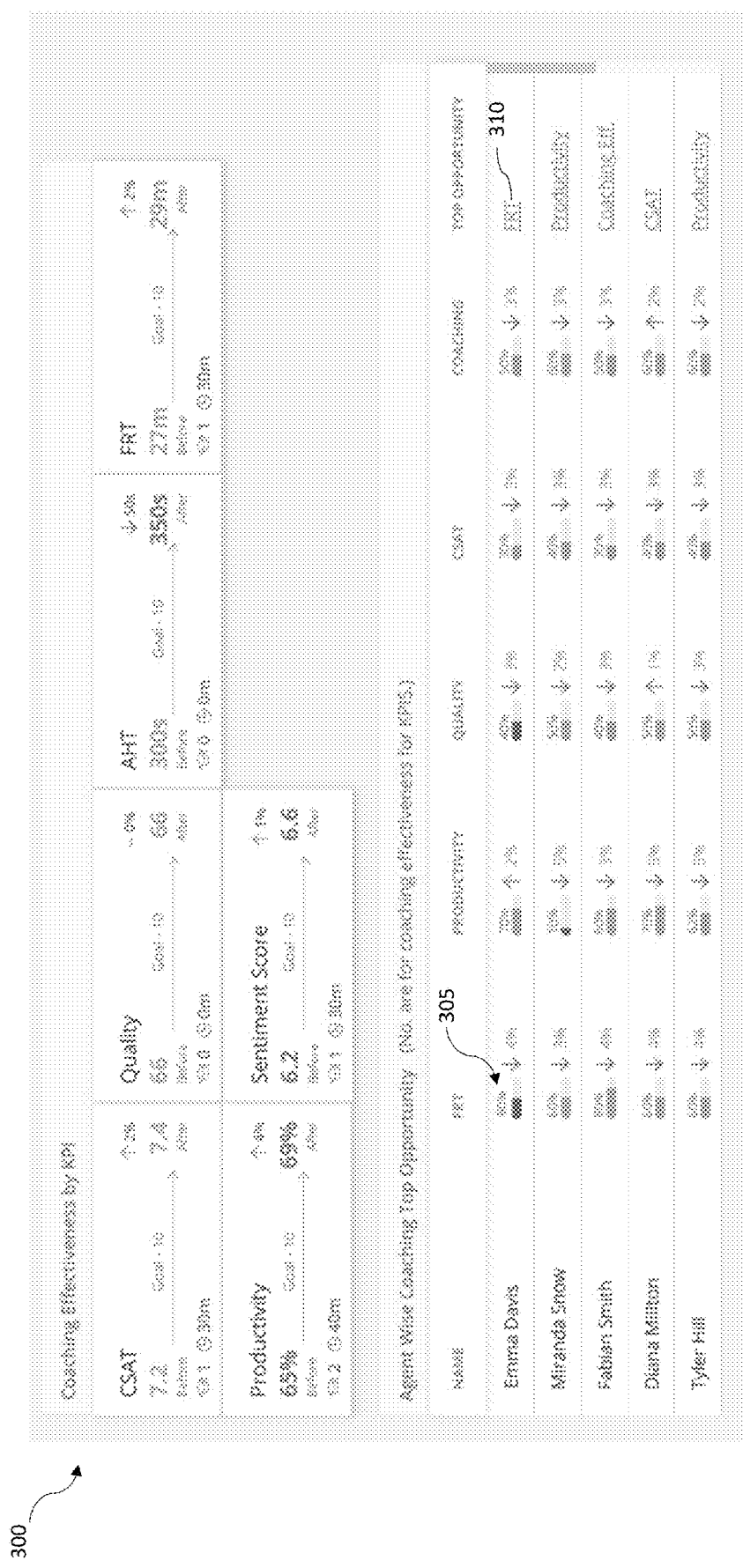
FIG. 3 is a screenshot of a user interface provided to a supervisor according to embodiments of the present disclosure.

Referring now to FIG. 3, shown is a screenshot 300 of a user interface provided to a supervisor. The supervisor can see that the FRT 305 of agent "Emma Davis" is on a negative trend. By clicking on the FRT link 310, the supervisor is redirected to the coaching creation page where Emma's name is prepopulated.

Figure 4A:
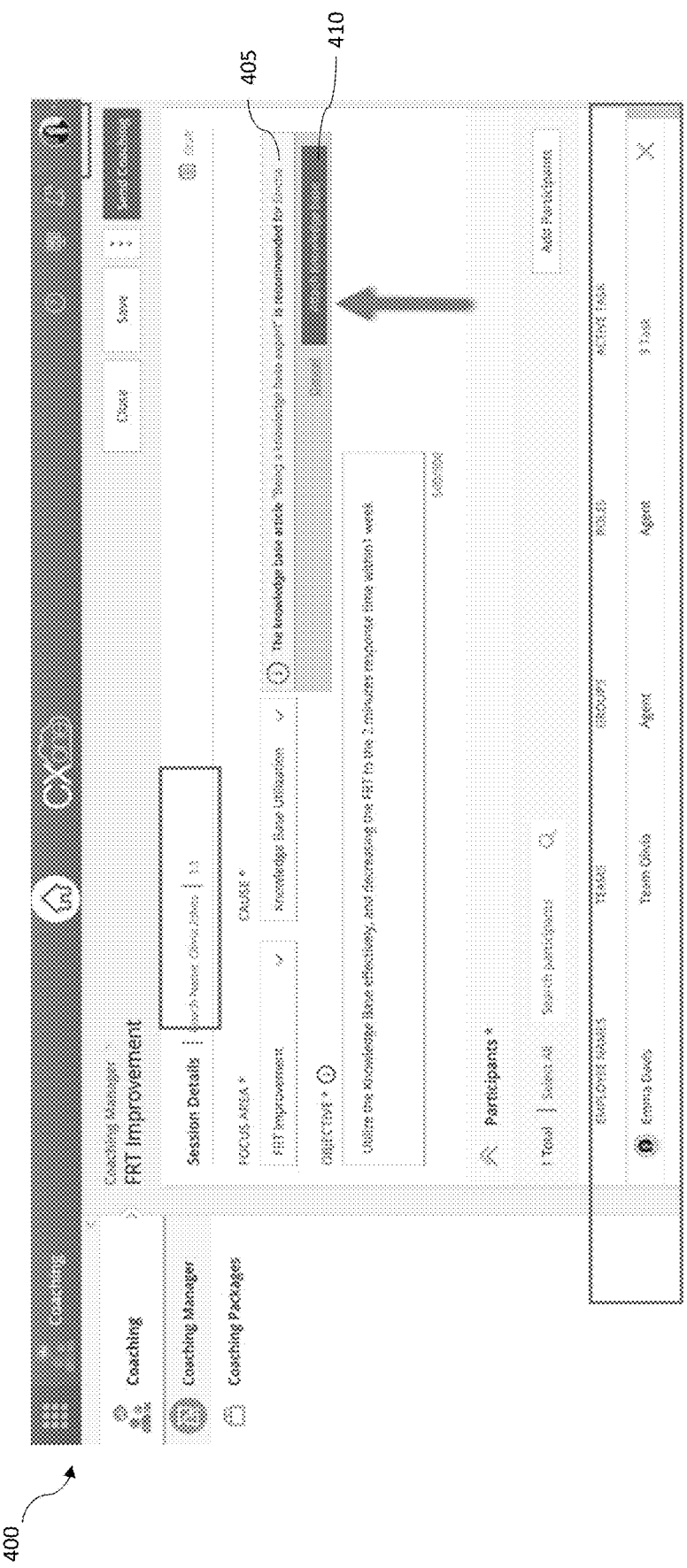
FIG. 4A is a screenshot of a coaching creation page according to embodiments of the present disclosure.

Referring now to FIG. 4A, a screenshot 400 of the coaching creation page is shown. Emma's name is prepopulated. A notification message 405 appears and recommends to the supervisor that being a knowledge base expert is the best coaching package for Emma since Emma's FRT has been increased when she spends time searching topics in the knowledge base and reviewing materials on those topics. The supervisor can click on the "attach knowledge base" button 410, and the coaching package is attached as well as coaching classifications (focus area and cause). This saves the supervisor time in investigating why the agent's FRT has been increasing.

Figure 4B:
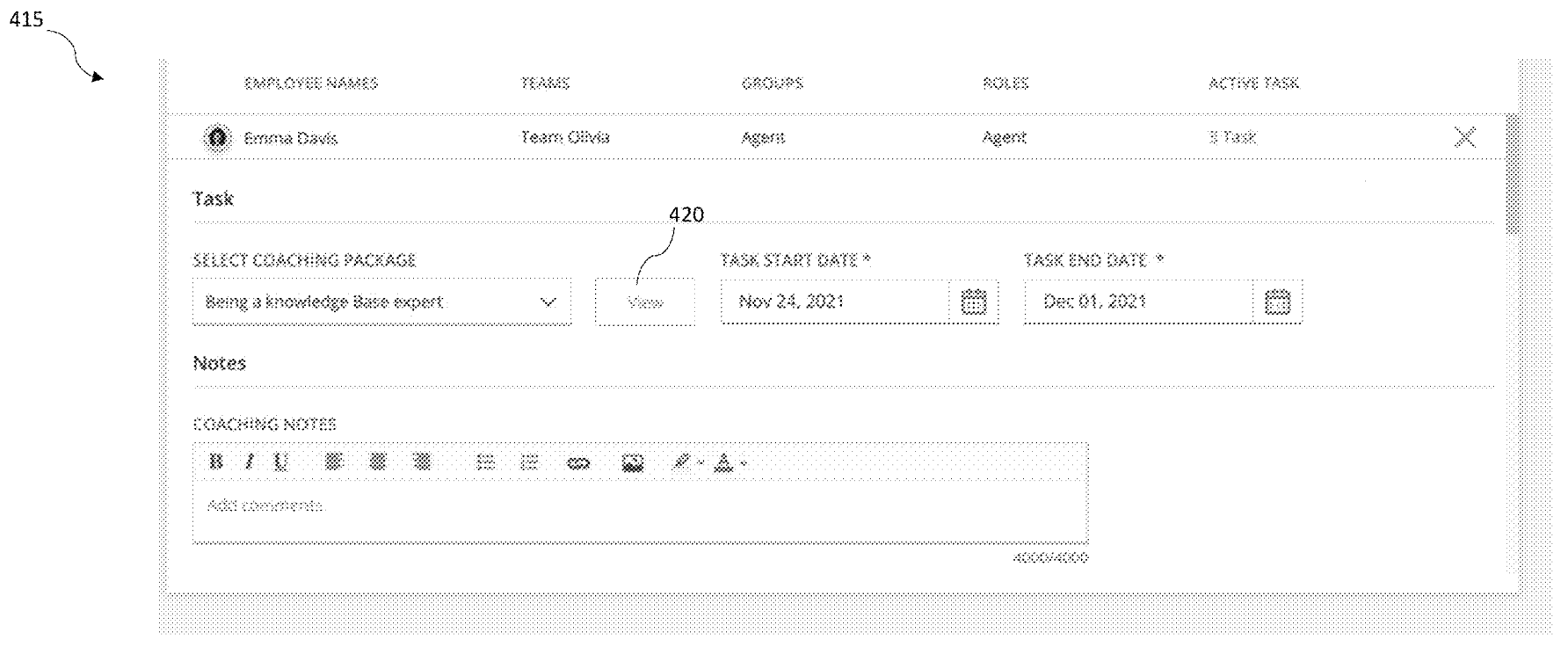
Figure 4C:
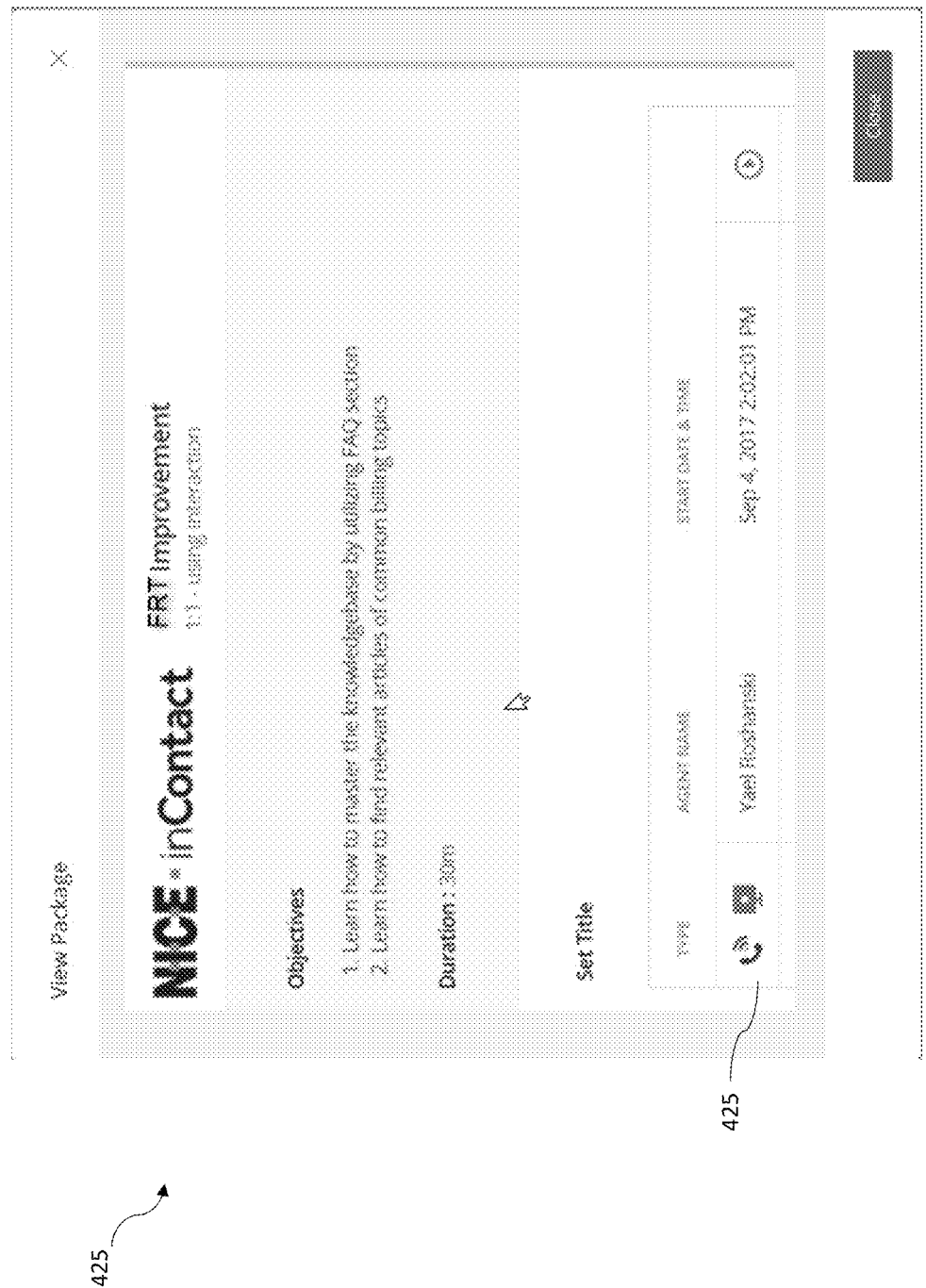
FIG. 4C illustrates a coaching package according to embodiment of the present disclosure.

FIG. 4B illustrates the coaching page 415 for Emma, which includes the coaching package. When Emma presses the view button 420, she is shown the relevant coaching package 425 in FIG. 4C that was added to the coaching session and sent to Emma for FRT improvement. The knowledge base article 425 includes audio and video for Emma to review.

Figure 5:
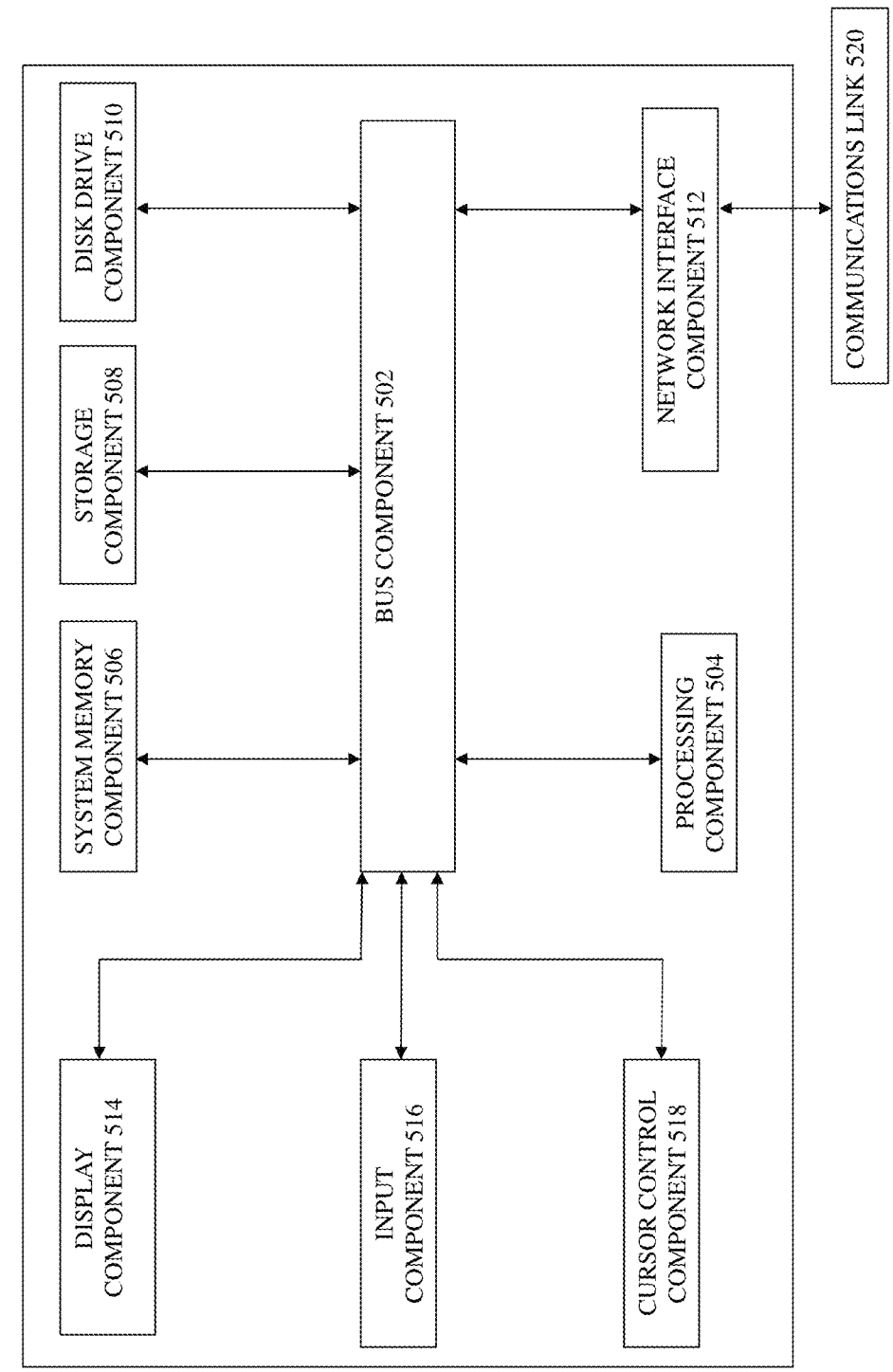
FIG. 5 is a block diagram of a computer system suitable for implementing one or more components in FIG. 1 according to one embodiment of the present disclosure.

Referring now to FIG. 5, illustrated is a block diagram of a system 500 suitable for implementing embodiments of the present disclosure. System 500, such as part a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to receive a plurality of interactions between a plurality of customers and a plurality of contact center agents; select a first contact center agent from the plurality of contact center agents; select a first agent skill from a plurality of agent skills assigned to the first contact center agent; extract interactions associated with the first agent skill from the plurality of interactions; identify a performance gap in the first contact center agent for the first agent skill based on the extracted interactions associated with the first agent skill; for each extracted interaction associated with the first agent skill, extract behavioral scores and metric scores of the first contact center agent and other contact center agents; compare the behavioral scores and the metric scores of the first contact center agent and the other contact center agents; determine that the behavioral scores of the first contact center agent and the other contact center agents are not significantly different by using a bootstrap sampling method; for each extracted interaction associated with the first agent skill, compute a knowledge gap score of the first contact center agent and the other contact center agents based on the respective metric scores; compare the knowledge gap score of the first contact center agent and the other contact center agents; determine that the knowledge gap score of the first contact center agent is significantly higher than the knowledge gap score of the other contact center agents; identify topics within the first agent skill that the first contact center agent needs coaching on by calculating a mutual information score for each topic; and provide to the first contact center agent one or more knowledge base articles selected based on the identified topics. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A coaching system comprising:
a processor and a computer readable medium operably coupled thereto, the computer readable medium comprising a plurality of instructions stored in association therewith that are accessible to, and executable by, the processor, to perform operations which comprise:
with an interaction analytics system:
receiving a plurality of interactions between a plurality of customers and a plurality of contact center agents;
with a supervisor graphical user interface (GUI):
providing a first selectable link to a first contact center agent from the plurality of contact center agents;
receiving a first user input to select the first selectable link;
in response to receiving the first user input, redirecting the user to a coaching creation page;
with the coaching creation page, providing a second selectable link to a first agent skill from a plurality of agent skills assigned to the first contact center agent;
receiving a second user input to select the second selectable link;
in response to the second user input, selecting the first agent skill;
with a summarization engine operatively connected to the interaction analytics system, extracting interactions associated with the first agent skill from the plurality of interactions;
with a performance management system operatively connected to the interaction analytics system:
identifying a performance gap in the first contact center agent for the first agent skill based on the extracted interactions associated with the first agent skill;
for each extracted interaction associated with the first agent skill, extracting behavioral scores and metric scores of the first contact center agent and other contact center agents;
comparing the behavioral scores and the metric scores of the first contact center agent and the other contact center agents;
determining that the behavioral scores of the first contact center agent and the other contact center agents are not significantly different by using a bootstrap sampling method;
for each extracted interaction associated with the first agent skill, computing a knowledge gap score of the first contact center agent and the other contact center agents based on the respective metric scores;
comparing the knowledge gap score of the first contact center agent and the other contact center agents;
determining that the knowledge gap score of the first contact center agent is significantly higher than the knowledge gap score of the other contact center agents;
identifying topics within the first agent skill that the first contact center agent needs coaching on by calculating a mutual information score for each topic,
wherein identifying topics within the first agent skill further comprises:
sorting interactions from the plurality of interactions associated with the first agent skill based on the knowledge gap score of the first contact center agent and the other contact center agents;
selecting sorted interactions in a top quartile and a bottom quartile based on the knowledge gap score;
collecting topics that occur in the top quartile and the bottom quartile;
removing topics that occur less in the top quartile than in the bottom quartile; and
returning topics with the highest mutual information score;
with a coaching GUI, displaying the topics with the highest mutual information score;
adding articles associated with the displayed topics to a new coaching session, wherein the articles comprise videos or infographics;
with the coaching GUI, receiving a third user input; and
with the coaching GUI, in response to receiving the third user input, displaying the coaching session.

2. The coaching system of claim 1, wherein the operations further comprise:
expanding the identified topics to a list of terms;
transmitting the list of terms to a knowledge base; and
receiving the articles from the knowledge base;
wherein the providing comprises automatically performing an action to provide the articles to the first contact center agent.

3. The coaching system of claim 2, wherein automatically performing the action comprises transmitting an alert to the first contact center agent or a supervisor including a recommendation that the first contact center agent should review the articles.

4. The coaching system of claim 1, wherein the metric scores comprise a score for average handling time, first call resolution, sentiment, talk time, or silence time, or a combination thereof.

5. The coaching system of claim 4, wherein computing the knowledge gap score further comprises computing a weighted sum of scores for first call resolution, talk time, and silence time.

6. The coaching system of claim 1, wherein each of the articles comprises a relevancy score.

7. The coaching system of claim 6, wherein the operations further comprise:
establishing a relevancy threshold; and
removing an article having a relevancy score below the relevancy threshold before adding the articles to the coaching session.

8. The coaching system of claim 1, wherein the other contact center agents comprise agents on the same team as the first contact center agent or agents at the same contact center.

9. The coaching system of claim 1, wherein identifying the performance gap comprises:
receiving a score of the first contact center agent for the first agent skill;
receiving a score of other contact center agents for the first agent skill;

determining a difference between the score of the first contact center agent for the first agent skill and the score of other contact center agents for the first agent skill; and determining that the difference is greater than a defined threshold.

10. The method of claim 9, wherein each of the articles comprises a relevancy score, and the method further comprises:

establishing a relevancy threshold; and removing a knowledge base article having a relevancy score below the relevancy threshold.

11. A computer-implemented method of providing coaching to a contact center agent, which comprises:

with an interaction analytics system operating on a processor equipped with a memory:

receiving a plurality of interactions between a plurality of customers and a plurality of contact center agents;

with a supervisor graphical user interface (GUI):

providing a first selectable link to a first contact center agent from the plurality of contact center agents;

receiving a first user input to select the first selectable link;

in response to receiving the first user input, redirecting the user to a coaching creation page;

with the coaching creation page, providing a second selectable link to a first agent skill from a plurality of agent skills assigned to the first contact center agent;

receiving a second user input to select the second selectable link;

in response to the second user input, selecting the first agent skill;

with a summarization engine operatively connected to the interaction analytics system, extracting interactions associated with the first agent skill from the plurality of interactions;

with a performance management system operatively connected to the interaction analytics system:

identifying a performance gap in the first contact center agent for the first agent skill based on the extracted interactions associated with the first agent skill;

for each extracted interaction associated with the first agent skill, extracting behavioral scores and metric scores of the first contact center agent and other contact center agents;

comparing the behavioral scores and the metric scores of the first contact center agent and the other contact center agents;

determining that the behavioral scores of the first contact center agent and the other contact center agents are not significantly different by using a bootstrap sampling method;

for each extracted interaction associated with the first agent skill, computing a knowledge gap score of the first contact center agent and the other contact center agents based on the respective metric scores;

comparing the knowledge gap score of the first contact center agent and the other contact center agents;

determining that the knowledge gap score of the first contact center agent is significantly higher than the knowledge gap score of the other contact center agents;

identifying topics within the first agent skill that the first contact center agent needs coaching on by calculating a mutual information score for each topic, wherein identifying topics within the first agent skill further comprises:

sorting interactions from the plurality of interactions associated with the first agent skill based on the knowledge gap score of the first contact center agent and the other contact center agents;

selecting sorted interactions in a top quartile and a bottom quartile based on the knowledge gap score;

collecting topics that occur in the top quartile and the bottom quartile;

removing topics that occur less in the top quartile than in the bottom quartile; and returning topics with the highest mutual information score;

with a coaching GUI, displaying the topics with the highest mutual information score;

adding articles associated with the displayed topics to a new coaching session, wherein the articles comprise videos or infographics;

with the coaching GUI, receiving a third user input; and with the coaching GUI, in response to receiving the third user input, displaying the coaching session.

12. The method of claim 11, which further comprises:

expanding the identified topics to a list of terms;

transmitting the list of terms to a knowledge base; and receiving the articles from the knowledge base.

13. The method of claim 11, wherein the metric scores comprise a score for average handling time, first call resolution, sentiment, talk time, or silence time, or a combination thereof.

14. The method of claim 13, wherein computing the knowledge gap score comprises computing a weighted sum of scores for first call resolution, talk time, and silence time.

15. A non-transitory computer-readable medium having stored thereon computer-readable instructions executable by a processor to perform operations which comprise:

with an interaction analytics system:

receiving a plurality of interactions between a plurality of customers and a plurality of contact center agents;

with a supervisor graphical user interface (GUI):

providing a first selectable link to a first contact center agent from the plurality of contact center agents;

receiving a first user input to select the first selectable link;

in response to receiving the first user input, redirecting the user to a coaching creation page;

with the coaching creation page, providing a second selectable link to a first agent skill from a plurality of agent skills assigned to the first contact center agent;

receiving a second user input to select the second selectable link;

in response to the second user input, selecting the first agent skill;

with a summarization engine operatively connected to the interaction analytics system, extracting interactions associated with the first agent skill from the plurality of interactions;

with a performance management system operatively connected to the interaction analytics system:

identifying a performance gap in the first contact center agent for the first agent skill based on the extracted interactions associated with the first agent skill;

for each extracted interaction associated with the first agent skill, extracting behavioral scores and metric scores of the first contact center agent and other contact center agents;

comparing the behavioral scores and the metric scores of the first contact center agent and the other contact center agents;

determining that the behavioral scores of the first contact center agent and the other contact center agents are not significantly different by using a bootstrap sampling method;

for each extracted interaction associated with the first agent skill, computing a knowledge gap score of the first contact center agent and the other contact center agents based on the respective metric scores;

comparing the knowledge gap score of the first contact center agent and the other contact center agents;

determining that the knowledge gap score of the first contact center agent is significantly higher than the knowledge gap score of the other contact center agents;

identifying topics within the first agent skill that the first contact center agent needs coaching on by calculating a mutual information score for each topic, wherein identifying topics within the first agent skill further comprises:

sorting interactions from the plurality of interactions associated with the first agent skill based on the knowledge gap score of the first contact center agent and the other contact center agents;

selecting sorted interactions in a top quartile and a bottom quartile based on the knowledge gap score;

collecting topics that occur in the top quartile and the bottom quartile;

removing topics that occur less in the top quartile than in the bottom quartile; and returning topics with the highest mutual information score;

with a coaching GUI, displaying the topics with the highest mutual information score;

adding articles associated with the displayed topics to a new coaching session, wherein the articles comprise videos or infographics;

with the coaching GUI, receiving a third user input; and with the coaching GUI, in response to receiving the third user input, displaying the coaching session.

16. The non-transitory computer-readable medium of claim 15, wherein the operations further comprise:

expanding the identified topics to a list of terms;

transmitting the list of terms to a knowledge base; and receiving the articles from the knowledge base.

17. The non-transitory computer-readable medium of claim 15, wherein each of the articles comprises a relevancy score and wherein the operations further comprise:

establishing a relevancy threshold; and removing a knowledge base article having a relevancy score below the relevancy threshold.

* * * * *